United States Patent [19]

Lawrence et al.

[11] Patent Number: 5,369,080
[45] Date of Patent: Nov. 29, 1994

[54] INDOANILINE DYE MIXTURE IN DYE-DONOR ELEMENT FOR THERMAL DYE TRANSFER

[75] Inventors: Kristine B. Lawrence; Steven Evans, both of Rochester, N.Y.

[73] Assignee: Eastman Kodak Company, Rochester, N.Y.

[21] Appl. No.: 169,779

[22] Filed: Dec. 16, 1993

[51] Int. Cl.$^5$ .................. B41M 5/035; B41M 5/38
[52] U.S. Cl. .................. 503/227; 428/195; 428/480; 428/913; 428/914
[58] Field of Search .................. 8/471; 428/195, 913, 428/914; 503/227

[56] References Cited

U.S. PATENT DOCUMENTS 4,695,287  9/1987  Evans et al. .................. 8/471

Primary Examiner—B. Hamilton Hess
Attorney, Agent, or Firm—Harold E. Cole

[57] ABSTRACT

A cyan dye-donor element for thermal dye transfer imaging comprising a support having thereon a dye layer comprising a dye dispersed in a polymeric binder, wherein the dye comprises a mixture of at least two different cyan dyes, each of the dyes comprising a 2-carbamoyl-4-[N-(p-substituted aminoaryl)imino]-1,4-naphthoquinone, with the proviso that at least one dye is present at a concentration of at least 10 wt.% and that same dye also contains an alkyl group substituted with a group capable of intermolecular hydrogen bonding.

12 Claims, No Drawings

INDOANILINE DYE MIXTURE IN DYE-DONOR ELEMENT FOR THERMAL DYE TRANSFER

This invention pertains to dye-donor elements for thermal dye transfer and, more particularly, to the use of mixtures of indoaniline dyes with at least one such dye containing an alkyl group substituted with a group capable of intermolecular hydrogen bonding.

In recent years, thermal transfer systems have been developed to obtain prints from pictures which have been generated electronically from a color video camera. According to one way of obtaining such prints, an electronic picture is first subjected to color separation by color filters. The respective color-separated images are then converted into electrical signals. These signals are then operated on to produce cyan, magenta and yellow electrical signals. These signals are then transmitted to a thermal printer. To obtain the print, a cyan, magenta or yellow dye-donor element is placed face-to-face with a dye receiving element. The two are then inserted between a thermal printing head and a platen roller. A line-type thermal printing head is used to apply heat from the back of the dye-donor sheet. The thermal printing head has many heating elements and is heated up sequentially in response to the cyan, magenta and yellow signals. The process is then repeated for the other two colors. A color hard copy is thus obtained which corresponds to the original picture viewed on a screen. Further details of this process and an apparatus for carrying it out are contained in U.S. Pat. No. 4,621,271, the disclosure of which is hereby incorporated by reference.

An important requirement for any thermal dye-donor element is to maintain performance over its useful lifetime without degradation in image quality. The dye layer of a dye-donor element for resistive head thermal dye transfer generally comprises a polymeric binder and diffusible dyes. The percentage of dye in the layer is typically quite high, in the range of 20 to 80%. The dye is usually dissolved in the binder or phase-separated into small domains. During keeping of the dye-donor element, the temperature and humidity may be elevated and the dye layer is in contact with a slipping layer coated on the backside of the dye-donor element when it is wound up in spool form. The slipping layer may contain mobile lubricating oils or materials which can act as plasticizers or solvents for the dye layer. This can lead to dye mobility, resulting in changes in the layer including further phase separation, migration of the dye to the surface, and possible crystallization of the dye. Dye may also transfer to the slipping layer. These changes generally result in sensitometric variations, nonuniform printing due to light or dark spots, and dye smearing from a high-density to a low-density area of the print.

U.S. Pat. No. 4,695,287 discloses the use of cyan dyes in the dye-donor element for thermal dye transfer comprising a 2-carbamoyl-4-[N-(p-substituted aminoaryl)imino]-1,4-naphthoquinone, including dyes capable of intermolecular hydrogen bonding. However, there is no disclosure in this patent for mixing dyes from this class to improve donor keeping properties.

It is the object of this invention to provide a dye-donor element for thermal dye transfer which minimizes sensitometric changes upon keeping while maintaining reasonable dye efficiency during printing.

These and other objects are achieved in accordance with this invention which comprises a cyan dye-donor element for thermal dye transfer imaging comprising a support having thereon a dye layer comprising a dye dispersed in a polymeric binder, wherein the dye comprises a mixture of at least two different cyan dyes, each of the dyes comprising a 2-carbamoyl-4-[N-(p-substituted aminoaryl)imino]-1,4-naphthoquinone, with the proviso that at least one dye is present at a concentration of at least 10 wt.% and that same dye also contains an alkyl group substituted with a group capable of intermolecular hydrogen bonding.

It has been found unexpectedly that the cyan dye-donor elements according to the invention are significantly improved in their raw stock keeping and sensitometric stability properties.

In a preferred embodiment of the invention, each of the cyan dyes in the mixture according to the invention has the following formula:

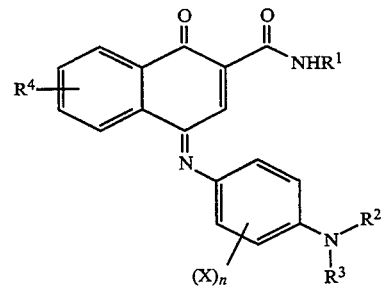

wherein
$R^1$, $R^2$ and $R^3$ each individually represents an alkyl group of from 1 to about 6 carbon atoms, a cycloalkyl group of from about 5 to about 7 carbon atoms, an aryl group of from about 5 to about 10 carbon atoms or an allyl group; or such alkyl, cycloalkyl, aryl and allyl groups substituted with one or more groups such as hydroxy, acyloxy, alkoxy, aryloxy, alkylthio, arylthio, alkylsulfonyl, arylsulfonyl, alkylsulfonamido, arylsulfonamido, thiocyano, cyano, nitro, halogen, alkoxycarbonyl, aryloxcarbonyl, acetyl, aroyl, alkylaminocarbonyl, arylaminocarbonyl, alkylaminosulfonyl, arylaminosulfonyl, alkylaminocarbonyloxy, arylaminocarbonyloxy, acylamino, amino, alkylarnino, arylamino, carboxy, trihalomethyl, alkyl, aryl, hetaryl, alkylureido, arylureido, succinimido, phthalimido and the like; such as methyl, ethyl, propyl, isopropyl, butyl, pentyl, hexyl, methoxyethyl, benzyl, 2-methane-sulfonamino-ethyl, 2-hydroxyethyl, 2-cyanoethyl, methoxycarbonylmethyl, cyclohexyl, cyclopentyl, phenyl, pyridyl, naphthyl, p-tolyl, p-chlorophenyl, m-(N-methylsulfamoyl)phenyl, etc.;

$R^2$ and $R^3$ may be combined together to form a 5- or 6-membered ring such as morpholine, pyrrolidine or piperidine;

$R^2$ and/or $R^3$ may be combined with one or two of X to form a 5- or 6-membered ring such as tetrahydroquinoline or julolidine;

$R^4$ and X each individually represents hydrogen; a substituted or unsubstituted alkyl group of from about 1 to about 6 carbon atoms, such as those described above for $R^1$, $R^2$, and $R^3$; halogen, such as chlorine, bromine, or fluorine; —NHCOR$^1$ or —NHSO$_2$R$^1$; and n represents an integer from 1 to 4;

with the proviso that at least one of the dyes is present at a minimum concentration of at least 10 wt.%, and wherein at least one of R$^1$, R$^2$, R$^3$, R$^4$ and X in that dye is an alkyl group substituted with a group capable of intermolecular hydrogen bonding.

Groups capable of intermolecular hydrogen bonding within the scope of the invention include, for example, hydroxyl (—OH); sulfonamino (—SO$_2$NHR$^1$ or —NHSO$_2$R$^1$) and acylamino (—NHCOR$^1$ or —CONHR$^1$) (R$^1$ being defined as above).

Compounds included within the scope of the invention include the following:

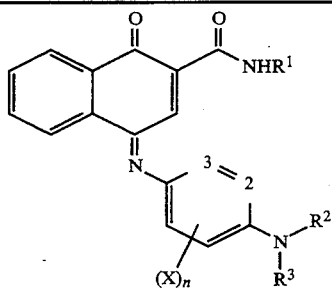

| Cmpd. | R$^2$ | R$^3$ | X | R$^1$ |
|---|---|---|---|---|
| D-1 | C$_2$H$_5$ | C$_2$H$_5$ | H | CH$_3$ |
| D-2 | C$_2$H$_5$ | C$_2$H$_5$ | 3-CH$_3$ | CH$_3$ |
| D-3 | C$_2$H$_5$ | C$_2$H$_5$ | H | C$_2$H$_5$ |
| D-4* | C$_2$H$_5$ | CH$_2$CH$_2$NHSO$_2$CH$_3$ | H | C$_2$H$_5$ |
| D-5* | C$_2$H$_5$ | CH$_2$CH$_2$NHSO$_2$CH$_3$ | H | i-C$_3$H$_7$ |
| D-6* | C$_2$H$_5$ | CH$_2$CH$_2$OH | H | C$_2$H$_5$ |
| D-7* | C$_2$H$_5$ | CH$_2$CH$_2$NHSO$_2$CH$_3$ | 3-CH$_3$ | C$_2$H$_5$ |
| D-8* | C$_2$H$_5$ | CH$_2$CH$_2$OCH$_3$ | 3-CH$_3$ | CH$_2$CHCH$_3$<br>\|<br>OH |
| D-9* | C$_2$H$_5$ | C$_2$H$_5$ | H | CH$_2$CH$_2$NH—C(O)CH$_3$ |
| D-10* | C$_2$H$_5$ | CH$_2$CH$_2$NHC(O)CH$_3$ | H | CH$_3$ |
| D-11* | C$_2$H$_5$ | CH$_2$CH$_2$NHC(O)CH$_3$ | 3-CH$_3$ | CH$_3$ |

*These dyes come within the proviso in the formula

A dye-barrier layer may be employed in the dye-donor elements of the invention to improve the density of the transferred dye. Such dye-barrier layer materials include hydrophilic materials such as those described and claimed in U.S. Pat. No. 4,716,144.

The dyes in the dye-donor element of the invention are dispersed in a polymeric binder such as a cellulose derivatives, e.g., cellulose acetate hydrogen phthalate, cellulose acetate, cellulose acetate propionate, cellulose acetate butyrate, cellulose triacetate or any of the materials described in U.S. Pat. No. 4,700,207; a polycarbonate; poly(styrene-co-acrylonitrile), a polysulfone or a poly(phenylene oxide). The binder may be used at a coverage of from about 0.1 to about 5 g/m$^2$.

The dye layer of the dye-donor element may be coated on the support or printed thereon by a printing technique such as a gravure process.

Any material can be used as the support for the dye-donor element of the invention provided it is dimensionally stable and can withstand the heat of the thermal printing heads. Such materials include polyesters such as poly(ethylene terephthalate); polyamides; polycarbonates; glassine paper; condenser paper; cellulose esters such as cellulose acetate; fluorine polymers such as poly(vinylidene fluoride) or poly(tetrafluoroethylene-co-hexafluoropropylene); polyethers such as polyoxymethylene; polyacetals; polyolefins such as polystyrene, polyethylene, polypropylene or methylpentene polymers; and polyimides such as polyimide-amides and polyether-imides. The support generally has a thickness of from about 2 to about 30 μm. It may also be coated with a subbing layer, if desired, such as those materials described in U.S. Pat. Nos. 4,695,288 and 4,737,486.

The reverse side of the dye-donor element may be coated with a slipping layer to prevent the printing head from sticking to the dye-donor element. Such a slipping layer would comprise a lubricating material such as a surface-active agent, a liquid lubricant, a solid lubricant or mixtures thereof, with or without a polymeric binder. Preferred lubricating materials include oils or semicrystalline organic solids that melt below 100° C. such as poly(vinyl stearate), beeswax, perfluorinated alkyl ester polyethers, polycaprolactone, silicone oil, poly(tetrafluoroethylene), carbowax, poly(ethylene glycols), or any of those materials disclosed in U.S. Pat. Nos. 4,717,711, 4,717,712, 4,737,485, 4,738,950, and 4,829,050. Suitable polymeric binders for the slipping layer include poly(vinyl alcohol-co-butyral), poly(vinyl alcohol-co-acetal), polystyrene, poly(vinyl acetate), cellulose acetate butyrate, cellulose acetate propionate, cellulose acetate or ethyl cellulose.

The amount of the lubricating material to be used in the slipping layer depends largely on the type of lubricating material, but is generally in the range of about 0.001 to about 2 g/m$^2$. If a polymeric binder is employed, the lubricating material is present in the range of 0.001 to 50 weight %, preferably 0.5 to 40, of the polymeric binder employed.

The dye-receiving element that is used with the dye-donor element of the invention usually comprises a support having thereon a dye image-receiving layer. The support may be a transparent film such as a poly(ether sulfone), a polyimide, a cellulose ester such as cellulose acetate, a poly(vinyl alcohol-co-acetal) or a poly(ethylene terephthalate). The support for the dye-receiving element may also be reflective such as baryta-coated paper, polyethylene-coated paper, white polyester (polyester with white pigment incorporated therein), an ivory paper, a condenser paper or a synthetic paper such as DuPont Tyvek ®.

The dye image-receiving layer may comprise, for example, a polycarbonate, a polyurethane, a polyester, poly(vinyl chloride), poly(styrene-co-acrylonitrile), polycaprolactone or mixtures thereof. The dye image-receiving layer may be present in any amount which is effective for the intended purpose. In general, good results have been obtained at a concentration of from about 1 to about 5 g/m$^2$.

As noted above, the dye-donor elements of the invention are used to form a dye transfer image. Such a process comprises imagewise-heating a dye-donor element as described above and transferring a dye image to a dye-receiving element to form the dye transfer image.

The dye-donor element of the invention may be used in sheet form or in a continuous roll or ribbon. If a continuous roll or ribbon is employed, it may have only the dye thereon as described above or may have alternating areas of other different dyes, such as sublimable cyan and/or magenta and/or yellow and/or black or other dyes. Such dyes are disclosed in U.S. Pat. Nos. 4,541,830, 4,698,651, 4,695,287, 4,701,439, 4,757,046, 4,743,582, 4,769,360, and 4,753,922; the disclosures of which are hereby incorporated by reference. Thus, one-, two-, three- or four-color elements (or higher numbers also) are included within the scope of the invention.

In a preferred embodiment of the invention, the dye-donor element comprises a poly(ethylene terephthalate) support coated with sequential repeating areas of yellow, magenta and the cyan dyes as described above, and the above process steps are sequentially performed for each color to obtain a three-color dye transfer image. Of course, when the process is only performed for a single color, then a monochrome dye transfer image is obtained.

Thermal printing heads which can be used to transfer dye from the dye-donor elements of the invention are available commercially. There can be employed, for example, a Fujitsu Thermal Head (FTP-A040MCS001), a TDK Thermal Head F415 HH7-1089 or a Rohm Thermal Head KE 2008-F3.

A thermal dye transfer assemblage of the invention comprises:

(a) a dye-donor element as described above, and
(b) a dye-receiving element as described above, the dye-receiving element being in a superposed relationship with the dye-donor element so that the dye layer of the donor element is in contact with the dye image-receiving layer of the receiving element.

The above assemblage comprising these two elements may be preassembled as an integral unit when a monochrome image is to be obtained. This may be done by temporarily adhering the two elements together at their margins. After transfer, the dye-receiving element is then peeled apart to reveal the dye transfer image.

When a three-color image is to be obtained, the above assemblage is formed on three occasions during the time when heat is applied by the thermal printing head. After the first dye is transferred, the elements are peeled apart. A second dye-donor element (or another area of the donor element with a different dye area) is then brought in register with the dye-receiving element and the process repeated. The third color is obtained in the same manner.

The following examples are provided to illustrate the invention.

EXAMPLE 1

Cyan dye-donor elements were prepared by coating the following layers in the order recited on a 6 $\mu$m poly(ethylene terephthalate) support:

1) a subbing layer of DuPont Tyzor TBT ® titanium tetra-n-butoxide (0.12 g/m$^2$) coated from a propyl acetate/butanol solvent mixture, and
2) a dye layer containing the mixture of cyan dyes (A and B) identified below and illustrated above, Fluorad FC-430 ® fluorosurfactant (3M Company) (0.02 g/m$^2$), a micronized blend of polyethylene, polypropylene and oxidized polyethylene particles (Shamrock Technologies S363-N1) (0.02 g/m$^2$) in a cellulose acetate propionate binder (2.5% acetyl, 45% propionyl) (0.34 g/m$^2$) coated from a mixture of toluene, methanol and cyclopentanone (66:29:5).

On the back side of the dye-donor element was coated:

1) a subbing layer as above, and
2) a slipping layer of Emralon 329 ® dry film lubricant of poly(tetrafluoro-ethylene) particles in a cellulose nitrate resin binder (Acheson Colloids) (0.54 g/m$^2$) and carnauba wax (0.016 g/m$^2$) from a toluene, n-propyl acetate, 2-propanol and 1-butanol solvent mixture.

The dye-image receiving element was prepared by extrusion laminating a paper core with a 38 $\mu$m thick microvoided composite film (OPPalyte ® 350TW, Mobil Chemical Co.) as disclosed in U.S. Pat. No. 5,244,861. The film side of the resulting laminate was then coated with the following in the order recited:

(1) subbing layer of Dow Z-6020 [N-(2-aminoethyl)-3-aminopropyl]-trimethoxysilane from Dow Corning Co.) (0.11 g/m$^2$) coated from ethanol;
(2) dye-receiving layer of Makroion ® 5700 bisphenol A polycarbonate (Bayer AG) (1.614 g/m$^2$), a random copolymer of 4,4'-isopropylidene-bis-phenol-co-2,2'-oxydiethanol poylcarbonate (50:50) (1.614 g/m$^2$), dibutyl phthalate (0.323 g/m$^2$), diphenyl phthalate (0.323 g/m$^2$) and Fluorad FC-431 ® fluorosurfactant (3M Company) (0.011 g/m$^2$) coated from dichloromethane;
(3) overcoat layer of a linear condensation copolycarbonate of bisphenol-A (50 mole%), diethylene glycol (49 mole %), and 2,500 MW polydimethylsiloxane block units (1 mole %) (11 g/m$^2$), Fluorad FC-431 ® fluorosurfactant (3M Company) (0.02 g/m$^2$) and Dow Corning 510 Silicone Fluid (0.01 g/m$^2$) coated from dichloromethane.

Accelerated keeping tests were performed by hand winding samples of the donors on plastic cores under constant tension and placing them (sealed at 40% RH in a foil-lined bag) into accelerated keeping ovens at 60° C./70% RH for 3 days. The dye side of said donor elements were rolled against a 6 $\mu$m poly(ethylene terephthalate) support coated with a slipping layer of 0.48 g/m$^2$ KS-1 poly(vinyl acetal) (Sekisui Chemical Co., Ltd.), 0.0003 g/m$^2$ p-toluenesulfonic acid, 0.01 g/m$^2$ PS-513 (an arninopropyl dimethyl terminated polydimethyl siloxane) (Hüls Co.), and 0.007 g/m$^2$ BYK S732 [a copolymer of poly(propylene oxide) and poly(methyl-octyl siloxane) 98% in Stoddard solvent, available from BYK Chemie] coated from a diethylketone/methanol solvent mixture.

Eleven step sensitometric images were printed using the incubated donor samples and samples kept at room temperature. The dye side of a dye-donor element strip approximately 10 cm×13 cm in area was placed in contact with the dye image-receiving layer of the dye-receiver element of the same area. The assemblage was clamped to a stepper-motor-driven 60 mm diameter rubber roller. A TDK head L231, thermostated at 31° C. was pressed with a force of 24.4 Newtons against the dye donor element side of the assemblage pushing it against the rubber roller.

The image electronics were activated causing the donor-receiver assemblage to be drawn through the printing head/roller nip at 11.1 mm/sec. Coincidentally, the resistive elements in the thermal print head were pulsed for 128 microsec/pulse at 129 microsec intervals during a 16.9 msec/dot printing time. A stepped image density was generated by incrementally increasing the number of pulses/dot from 0 to 127. The voltage supplied to the printed areas was approximately 10.25 v to 10.85 v (voltage adjusted to give final Dmax of 2.2 for all donor variations, see Table 1 for voltages used) resulting in an instantaneous peak power of 0.214 watts/dot to 0.240 watts/dot and a maximum total energy of 3.48 mJ/dot to 3.90 mJ/dot. The changes with incubation of Status A Red Density at step 6 (O.D.=0.55−0.60) are listed in Table 1.

TABLE 1

| Donor Element | Dye A (g/m²) | Dye B (g/m²) | Print Voltage | Red Density (Step 6) | | |
|---|---|---|---|---|---|---|
| | | | | Before Inc. | After Inc. | Delta |
| C-1 Control | D-1 (0.25) | D-2 (0.25) | 10.25 v | 0.57 | 0.94 | 0.37 |
| E-1 | D-3 (0.28) | D-5* (0.21) | 10.57 v | 0.58 | 0.63 | 0.05 |
| E-2 | D-6* (0.37) | D-7* (0.12) | 10.85 v | 0.63 | 0.80 | 0.17 |

*These dyes come within the proviso in the formula

The above data show that dye mixtures containing at least one dye substituted with an alkyl group capable of intermolecular hydrogen bonding significantly decreased the sensitometric change after incubation relative to the control mixture.

EXAMPLE 2

This example determines the minimum amount of dyes according the invention needed to show a decrease in sensitometric change after incubation. Dye-donor elements according to the invention, E-3 through E-9, and control dye-donor elements, C-2 through C-4, were prepared similar to E-1 described in Example 1 with the following exceptions. The slipping layer of the dye-donor support was the same one used in the test element in Example 1 which was wound face-to-face with the dye-donor element. In addition, no Fluorad FC-430® surfactant was used in the dye layer. The amount of each dye used in the dye-donor elements is listed in Table 2 below.

The dye-receiver used was the same as described in Example 1.

All dye-donor elements were tested as described in Example 1, except no interleaving was required prior to incubation (the dye side was rolled against the poly(vinyl acetal) slipping layer) and the following results were obtained:

TABLE 2

| Donor Element | Dye A (g/m²) | Dye B (g/m²) | Print Voltage | Red Density (Step 5) | | |
|---|---|---|---|---|---|---|
| | | | | Before Inc. | After Inc. | Delta |
| C-2 Control | D-3 (0.48) | — | 10.5 v | 0.64 | 0.75 | 0.11 |
| C-3 Control | D-3 (0.39) | D-2 (0.10) | 10.5 v | 0.63 | 0.70 | 0.07 |
| C-4 Control | D-3 (0.10) | D-2 (0.39) | 10.7 v | 0.49 | 0.59 | 0.10 |
| E-3 | D-3 (0.39) | D-4* (0.10) | 10.6 v | 0.58 | 0.62 | 0.05 |
| E-4 | D-3 (0.29) | D-4* (0.19) | 10.9 v | 0.61 | 0.62 | 0.01 |
| E-5 | D-3 (0.19) | D-4* (0.29) | 11.25 v | 0.65 | 0.66 | 0.01 |
| E-6 | D-3 (0.10) | D-4* (0.39) | 11.60 v | 0.67 | 0.67 | 0.00 |
| E-7 | — | D-4* (0.48) | 12.5 v | 0.80 | 0.79 | −0.01 |
| E-8 | D-3 (0.39) | D-5* (0.10) | 10.6 v | 0.58 | 0.63 | 0.05 |
| E-9 | D-3 (0.29) | D-5* (0.19) | 11.0 v | 0.64 | 0.65 | 0.01 |
| E-10 | D-3 (0.19) | D-5* (0.29) | 11.9 v | 0.84 | 0.82 | −0.02 |
| E-11 | D-3 (0.10) | D-5* (0.39) | 11.9 v | 0.75 | 0.74 | −0.01 |
| E-12 | — | D-5* (0.48) | 12.5 v | 0.80 | 0.79 | −0.01 |

TABLE 2-continued

| Donor Element | Dye A (g/m²) | Dye B (g/m²) | Print Voltage | Red Density (Step 5) | | |
|---|---|---|---|---|---|---|
| | | | | Before Inc. | After Inc. | Delta |
| | — | (0.48) | | | | |

*These dyes come within the proviso in the formula

The above data show that as little as 20 wt.% of the dyes according to the invention is required to show a significant decrease in the sensitometric change relative to the controls (C-2 compared with E-3 and E-8). A further advantage realized with these mixtures in the dye-donor element of the invention is the enhanced dye efficiency relative to dye-donor elements composed of only a single dye substituted with an alkyl group containing a substituent capable of intermolecular hydrogen bonding (compare print voltages for E-3 with E-7 and E-8 with E-12).

EXAMPLE 3

This example relates to dye mixtures containing dyes with different substituents capable of intermolecular hydrogen bonding.

Dye-donor elements E-13 through E-19 and control donor elements C-5 and C-6 were prepared similar to Example 2. The dye amounts used in each donor element are listed in Table 3 below.

The dye image-receiving element was prepared by extrusion laminating a paper core with the above 38 μm thick microvoided composite film from Mobil Chemical Co. The composite film side of the resulting laminate was then coated with the following layers in the order recited:

(1) subbing layer of Dow Z-6020 (0.11 g/m²) coated from ethanol;
(2) dye-receiving layer composed of Makrolon® KL3-1013 bisphenol A polycarbonate (Miles Labs.) (1.776 g/m²), Lexan® 141-112 (GE) polycarbonate (1.453 g/m²), dibutyl phthalate (0.323 g/m²), diphenyl phthatate (0.323 g/m²) and Fluorad FC-431® fluorosurfactant (3M Company) (0.011 g/m²) coated from dichloromethane; and
(3) overcoat layer of a linear condensation copolycarbonate of bisphenol-A (50 mole%), diethylene glycol (49 mole %), and 2,500 MW polydimethylsiloxane block units (1 mole %) (11 g/m²), Fluorad FC-431® fluorosurfactant (3M Company) (0.02 g/m²) and Dow Corning 510 Silicone Fluid (0.01 g/m²) coated from dichloromethane.

Eleven step sensitometric images were printed as described in Example 1 except that the resistive elements in the thermal print head were pulsed for 64 microsec/pulse at 129 microsec intervals during a 16.9 msec/dot printing time. A stepped image density was generated by incrementally increasing the number of pulses/dot from 0 to 127. The voltage supplied to the printed areas was approximately 14.5 v to 16.0 v resulting in an instantaneous peak power of 0.429 watts/dot to 0.522 watts/dot and a maximum total energy of 3.49 mJ/dot to 4.24 mJ/dot. The changes with incubation of Status A Red Density at step 5 (O.D.=0.55−0.60) are listed in Table 3 below.

TABLE 3

| Donor Element | Dye A (g/m²) | Dye B (g/m²) | Print Voltage | Red Density (Step 5) Before Inc. | Red Density (Step 5) After Inc. | Delta |
|---|---|---|---|---|---|---|
| C-5 Control | D-3 (0.48) | — | 14.5 v | 0.55 | 0.62 | 0.07 |
| C-6 Control | D-3 (0.44) | D-2 (0.05) | 14.6 v | 0.54 | 0.61 | 0.07 |
| E-13 | D-3 (0.44) | D-5* (0.05) | 14.8 v | 0.54 | 0.58 | 0.04 |
| E-14 | D-3 (0.19) | D-6* (0.29) | 15.0 v | 0.57 | 0.61 | 0.04 |
| E-15 | D-3 (0.19) | D-7* (0.29) | 16.0 v | 0.61 | 0.61 | 0.00 |
| E-16 | D-3 (0.19) | D-8* (0.29) | 15.3 v | 0.55 | 0.58 | 0.03 |
| E-17 | D-3 (0.19) | D-9* (0.29) | 15.3 v | 0.54 | 0.54 | 0.00 |
| E-18 | D-3 (0.19) | D-10* (0.29) | 15.6 v | 0.56 | 0.55 | −0.01 |
| E-19 | D-3 (0.19) | D-11* (0.29) | 15.6 v | 0.55 | 0.53 | −0.02 |

*These dyes come within the proviso in the formula

The above data show that all dye-donor elements containing dyes substituted with various groups capable of intermolecular hydrogen bonding showed a significant decrease in the sensitometric change relative to the controls (C-5 compared with E-14 through E-19). In addition, a twofold decrease in sensitometric change was seen with a dye element of the present invention containing only 10 wt.% of dye capable of intermolecular hydrogen bonding (E-13 compared with C-6).

The invention has been described in detail with particular reference to preferred embodiments thereof, but it will be understood that variations and modifications can be effected within the spirit and scope of the invention.

We claim:

1. A cyan dye-donor element for thermal dye transfer imaging comprising a support having thereon a dye layer comprising a dye dispersed in a polymeric binder, wherein said dye layer comprises a mixture of at least two different cyan dyes, each said dye comprising a 2-carbamoyl-4-[N-(p-substituted aminoaryl)imino]-1,4-naphthoquinone, with the proviso that at least one said dye is present at a concentration of at least 10 wt-% and that same said dye also contains an alkyl group substituted with a group capable of intermolecular hydrogen bonding.

2. The element of claim 1 wherein each of said cyan dyes to be mixed according to the invention has the following formula:

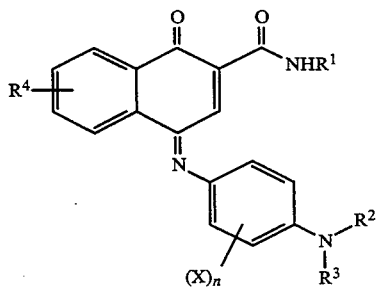

wherein $R^1$, $R^2$ and $R^3$ each individually represents a substituted or unsubstituted alkyl group of from 1 to about 6 carbon atoms, a substituted or unsubstituted cycloalkyl group of from about 5 to about 7 carbon atoms, a substituted or unsubstituted aryl group of from about 6 to about 10 carbon atoms or an allyl group;

$R^2$ and $R^3$ may be combined together to form a 5- or 6-membered ring;

$R^2$ and/or $R^3$ may be combined with one or two of X to form a 5- or 6-membered ring;

$R^4$ and X each individually represents hydrogen, a substituted or unsubstituted alkyl group of from about 1 to about 6 carbon atoms, halogen, —NCOR$^1$ or —NHSO$_2$R$^1$; and n represents an integer from 1 to 4;

with the proviso that at least one of said dyes is present at a minimum concentration of at least 10 wt.%, and wherein at least one of $R^1$, $R^2$, $R^3$, $R^4$ and X in that said dye is an alkyl group substituted with a group capable of intermolecular hydrogen bonding.

3. The element of claim 2 wherein said group capable of intermolecular hydrogen bonding is hydroxyl, sulfonamido or acylamino.

4. The element of claim 1 wherein said support comprises poly(ethylene terephthalate) and the side of the support opposite the side having thereon said dye layer is coated with a slipping layer comprising a lubricating material.

5. The element of claim 1 wherein said dye layer comprises repeating areas of yellow, magenta and said cyan dyes.

6. A process of forming a dye transfer image comprising imagewise-heating a dye donor element comprising a support having thereon a dye layer comprising a dye dispersed in a polymeric binder and transferring a dye image to a dye-receiving element to form said dye transfer image, wherein said dye comprises a mixture of at least two different cyan dyes, each said dye comprising a 2-carbamoyl-4-[N-(p-substituted aminoaryl)imino]-1,4-naphthoquinone, with the proviso that at least one said dye is present at a concentration of at least 10 wt-% and that same said dye also contains an alkyl group substituted with a group capable of intermolecular hydrogen bonding.

7. The process of claim 6 wherein each of said cyan dyes to be mixed according to the invention has the following formula:

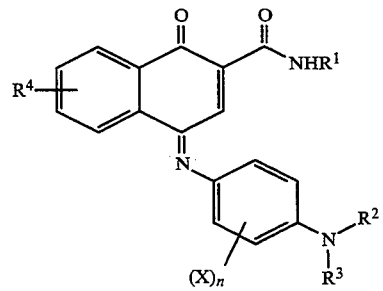

wherein $R^1$, $R^2$ and $R^3$ each individually represents a substituted or unsubstituted alkyl group of from 1 to about 6 carbon atoms, a substituted or unsubstituted cycloalkyl group of from about 5 to about 7 carbon atoms, a substituted or unsubstituted aryl group of from about 6 to about 10 carbon atoms or an allyl group;

$R^2$ and $R^3$ may be combined together to form a 5- or 6-membered ring;

$R^2$ and/or $R^3$ may be combined with one or two of X to form a 5- or 6-membered ring;

$R^4$ and X each individually represents hydrogen, a substituted or unsubstituted alkyl group of from about 1 to about 6 carbon atoms, halogen, —NHCOR$^1$ or —NHSO$_2$R$^1$; and n represents an integer from 1 to 4;

with the proviso that at least one of said dyes is present at a minimum concentration of at least 10 wt.%, and wherein at least one of R$^1$, R$^2$, R$^3$, R$^4$ and X in that said dye is an alkyl group substituted with a group capable of intermolecular hydrogen bonding.

8. The process of claim 7 wherein said group capable of intermolecular hydrogen bonding is hydroxyl, sulfonamido or acylamino.

9. The process of claim 6 wherein said support is poly(ethylene terephthalate) which is coated with sequential repeating areas of yellow, magenta and said cyan dyes, and said process steps are sequentially performed for each color to obtain a three-color dye transfer image.

10. A thermal dye transfer assemblage comprising:
   (a) a cyan dye-donor element comprising a support having thereon a dye layer comprising a dye dispersed in a polymeric binder, and
   (b) a dye-receiving element comprising a support having thereon a dye image-receiving layer, said dye-receiving element being in superposed relationship with said dye-donor element so that said dye layer is in contact with said dye image-receiving layer, wherein said dye comprises a mixture of at least two different cyan dyes, each said dye comprising a 2-carbamoyl-4-[N-(p-substituted aminoaryl)imino]-1,4naphthoquinone, with the proviso that at least one said dye is present at a concentration of at least 10 wt-% and that same said dye also contains an alkyl group substituted with a group capable of intermolecular hydrogen bonding.

11. The assemblage of claim 10 wherein each of said cyan dyes to be mixed according to the invention has the following formula:

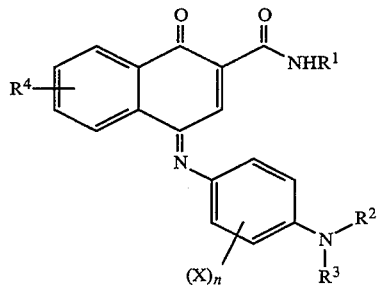

wherein

R$^1$, R$^2$ and R$^3$ each individually represents a substituted or unsubstituted alkyl group of from 1 to about 6 carbon atoms, a substituted or unsubstituted cycloalkyl group of from about 5 to about 7 carbon atoms, a substituted or unsubstituted aryl group of from about 6 to about 10 carbon atoms or an allyl group;

R$^2$ and R$^3$ may be combined together to form a 5- or 6-membered ring;

R$^2$ and/or R$^3$ may be combined with one or two of X to form a 5- or 6-membered ring;

R$^4$ and X each individually represents hydrogen, a substituted or unsubstituted alkyl group of from about 1 to about 6 carbon atoms, halogen, —NHCOR$^1$ or —NHSO$_2$R$^1$; and n represents an integer from 1 to 4;

with the proviso that at least one of said dyes is present at a minimum concentration of at least 10 wt.%, and wherein at least one of R$^1$, R$^2$, R$^3$, R$^4$ and X in that said dye is an alkyl group substituted with a group capable of intermolecular hydrogen bonding.

12. The assemblage of claim 11 wherein said group capable of intermolecular hydrogen bonding is hydroxyl, sulfoneunido or acylamino.

* * * * *